United States Patent [19]

Peperone

[11] 4,360,812
[45] Nov. 23, 1982

[54] FM-CW FUZE

[75] Inventor: Salvador J. Peperone, Silver Spring, Md.

[73] Assignee: The United States of America as represented by the Secretary of the Army, Washington, D.C.

[21] Appl. No.: 624,666

[22] Filed: Mar. 16, 1967

[51] Int. Cl.³ .................... G01S 13/32; F42C 13/04
[52] U.S. Cl. ................................. 343/14; 102/214; 343/7 PF
[58] Field of Search ............ 343/14, 5 DP, 17.2, 343/12 SP, 9, 10, 7 PF; 102/70.2 P, 214

[56] References Cited

U.S. PATENT DOCUMENTS

| | | | |
|---|---|---|---|
| 3,229,286 | 1/1966 | Samuel et al. | 343/14 |
| 3,256,520 | 6/1966 | Blitz | 343/14 |
| 3,419,861 | 12/1968 | Resnik et al. | 343/7 PF |

Primary Examiner—Malcolm F. Hubler
Attorney, Agent, or Firm—Nathan Edelberg; Robert P. Gibson; Saul Elbaum

[57] ABSTRACT

In this disclosure is described a FM-CW radar distance measuring system. By conventional means a frequency modulated continuous wave signal is generated and transmitted toward a target. A sample of the transmitted signal is compared with the received target return signal in a mixer. A second sample of the transmitted signal which is delayed by an amount proportional to the time required for a signal to travel to the target and return is compared with the first sample in a second mixer. The outputs of the two aforementioned mixers are amplified and compared in a third mixer, and the Doppler component is selected for use in indicating the distance to the target.

3 Claims, 2 Drawing Figures

FM-CW FUZE

In radar distance measuring systems employing the FM-CW waveform which are well known in the art, the signal is modulated according to a specified function of time, such as a sine wave or a triangular wave; it is then radiated in the direction of potential targets, reflected from these targets, and a portion of it is returned to a receiver associated with the system. Because of the finite time interval required for an electromagnetic wave to pass from a transmitter to a target and back to the transmitter, the instantaneous frequency of the received signal will differ from that of the simultaneously occurring transmitter signal. Further, in those cases where the measuring system and the target are moving relative to each other a Doppler frequency component will be present. Conventionally in such applications, the measuring system receiver comprises a mixer, the inputs of which are the transmitted signal and the received signal, and an amplifier at the output of the mixer may be tuned to the Doppler frequency. The Doppler frequency output of the amplifier can be detected and utilized in any desired manner to yield range information. In other range measuring systems the amplifier is tuned to a narrow band about a harmonic of the modulating frequency rather than to the Doppler frequency itself. Such devices have proven to be useful in military applications such as the proximity fuze, but a jamming signal transmitted at the Doppler frequency in some instances can cause the fuze to fire prematurely. Because the Doppler signal is of a relatively low frequency, an amplifier tuned to pass it will also pass numerous low frequency noise components, such as microphonics and diode noise with the possible result that a premature firing will be caused. The use of a delay line in the reference signal channel between the transmitter and mixer has been shown to be advantageous in prior art circuits. The delay line shifts the portion of the transmitted signal applied to the mixer so that its output envelope is a maximum when the target and reference delays are equal. In effect, this will move the range response characteristic away from zero range. Delay lines used for this purpose have been found to introduce excessive attenuation for long delays and thus restricting the use of devices of this type to very low altitudes.

It is, therefore, an object of this invention to provide an improved FM-CW distance measuring system.

Another object of this invention is to provide a FM-CW distance measuring system that will be much less subject to jamming signals that might cause premature firing.

A further object of this invention is to provide a FM-CW distance measuring system that will not respond to the low frequency noise components prevalent in a device of this type.

An additional object of this invention is to provide a FM-CW distance measuring system that can be used at high altitudes utilizing a high attenuation delay line in the reference channel.

It is still another object of this invention to provide a FM-CW distance measuring system in which greater non-linearity in the transmitter frequency-voltage characteristic can be tolerated.

The above-mentioned and other features and objects of this invention and the manner of attaining them will become more apparent and the invention itself will best be understood by reference to the following description of the prior art and an embodiment of the invention taken in conjunction with the following drawings.

Figure 1:
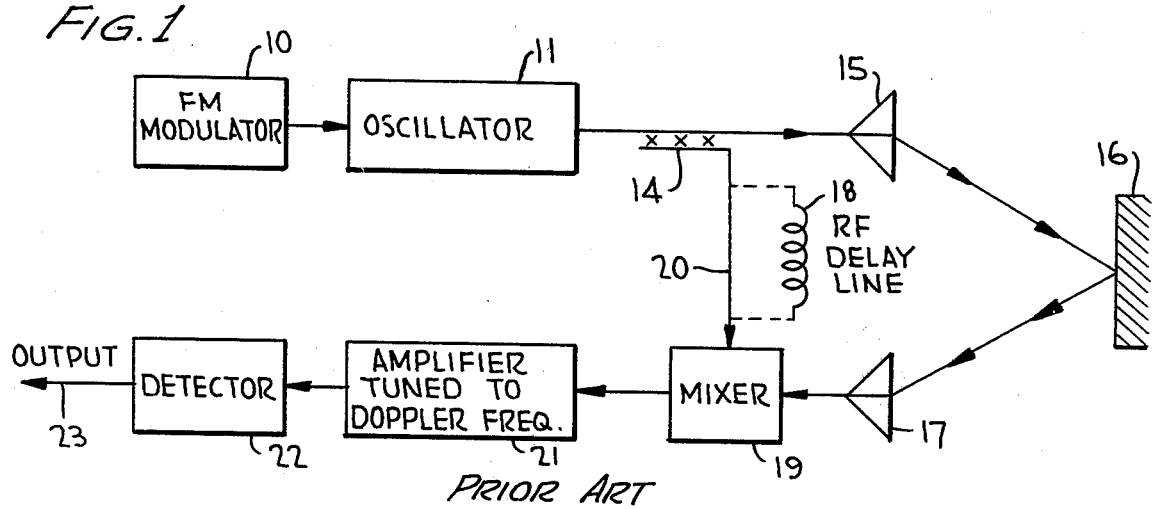
FIG. 1 is a block diagram of a characteristic embodiment of a prior art FM-CW distance measuring system.

In the prior art FM-CW distance measuring device depicted in FIG. 1, FM modulator 10 modulates oscillator 11 with a time varying waveform. Generally, this modulating waveform has been either a sine wave or a triangular wave. The modulated signal is coupled to a transmitting antenna 15 for radiation in the direction of a target 16. If the device is being used in an application where the target and the measuring system are in motion relative to each other, such as a fuze, the return signal picked up by receiving antenna 17 will be of a frequency that will differ from the transmitted frequency by an amount proportional to the distance between the target and measuring device, and be dependent on the modulating waveform as well as a Doppler frequency component. The return signal is applied to mixer 19 in which it is compared to a portion of the transmitted signal obtained from directional coupler 14 which is connected to the mixer by line 20. Amplifier 21, which is tuned to pass the Doppler component of the return signal is coupled to the output of mixer 19, and the amplified Doppler signal is then applied to detector 22 the output of which 23 may be utilized in any desired manner to provide range information.

In other prior art devices a delay line 18 is connected in the reference channel 20 between directional coupler 14 and mixer 19. A delay line in the reference channel has the effect of shifting the response characteristic away from the transmitter by an amount proportional to the time delay introduced by the delay line. Delay lines of the type necessary to operate at the higher frequencies used in FM-CW distance measuring systems introduce an undesirable amount of attenuation thus reducing the distance over which the system can operate on a given amount of power. As can be seen the prior art system of FIG. 1 can be jammed merely by selecting component frequencies that after being compared to the reference signal on line 20 in mixer 19, which is a non-linear device, will have a component within the passband of amplifier 21. It has been experienced, as well, that amplifier 21 would respond to a variety of low frequency noise components produced in the system, in particular, microphonics.

Figure 2:
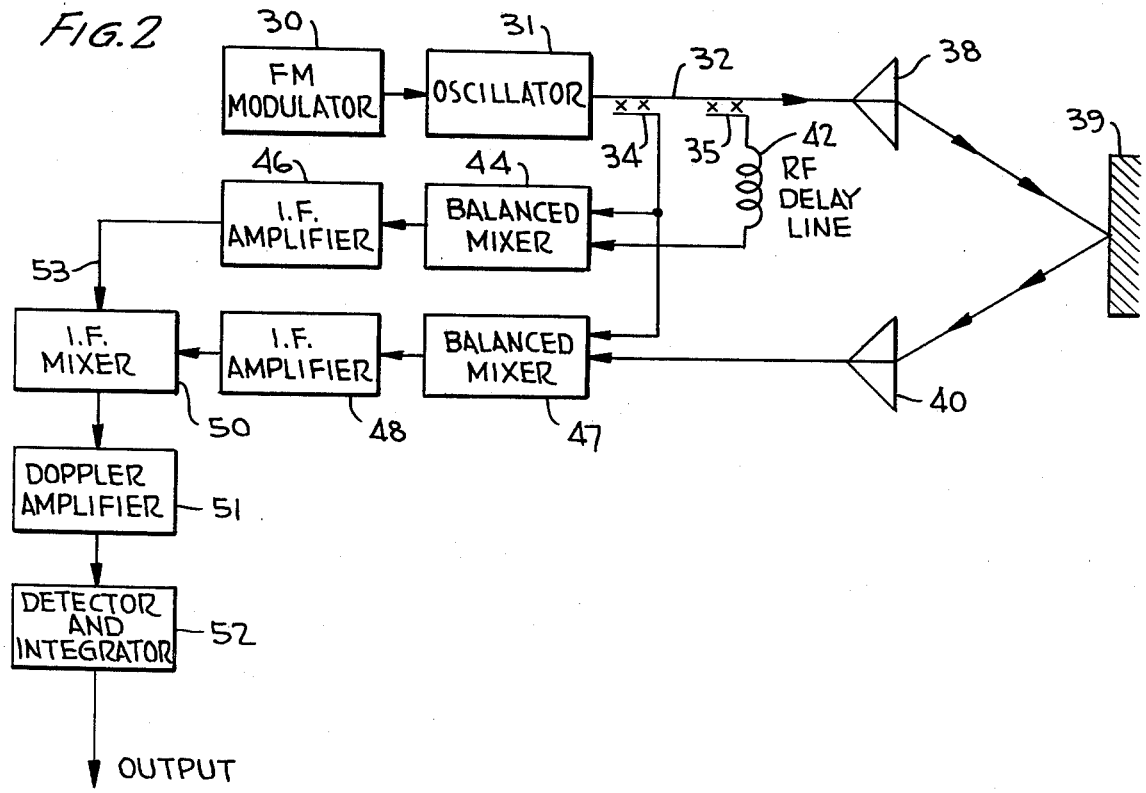
FIG. 2 is a block diagram of an embodiment of my invention.

In FIG. 2 is shown an embodiment of my invention as might be used in a high altitude fuze. However, the FM-CW distance measuring system herein described is not limited to such applications and may be used whenever the information that might be obtained from my invention is deemed desirable. FM modulator 30 provides a time varying waveform to oscillator 31, which might be a conventional L-band voltage-tunable magnetron. The modulated signal is then coupled to antenna 38 for radiation toward potential targets. The signal returned from target 39 is picked up by antenna 40, coupled to balanced mixer 47, and compared with a portion of the transmitted signal obtained from directional coupler 34. Meanwhile a portion of the transmitted signal has been obtained by directional coupler 35 and passed through delay line 42 to be mixed with a non-delayed sample of the transmitted signal obtained from directional coupler 34. The delay device might be of any of the several well-known types capable of operating at radio frequencies, and must be selected to have a delay equal to the delay of the target return signal at the nominal triggering altitude for the fuze. As discussed previously, delay lines of the type required for this application introduce a significant amount of attenuation, and, while the signal from the delay line could be amplified directly, it has been found that amplifying signals at these high frequencies introduces significant problems in terms of the components required to accomplish such amplification. This problem is alleviated by mixing the delayed signal as described above to yield a lower intermediate frequency for amplification by IF amplifier 46. An IF reference signal is thus generated that substantially matches the point-target return signal, except for the Doppler shift. If the target was indeed a point target, and if the target return signal was specular which is generally not the case, the IF reference signal on line 53 would completely match the target return signal except for the Doppler shift. Of course, taps might be provided on the delay line so that it could be adjusted to obtain a better match, but neither discontinuously nor continuously variable delay lines with satisfactory characteristics are yet available for operation at the high frequencies used in devices of this nature. In this embodiment amplifier 46 raises the IF reference signal to the one volt level for good switching of the mixer diodes in IF mixer 50 where the IF reference signal is compared to the target return signal which has been mixed at RF with the transmitted signal and amplified by IF amplifier 48. The output of IF mixer 50 is filtered and amplified by Doppler amplifier 51 which derives the Doppler component for detection and utilization as desired. Standard amplifiers with characteristics meeting the requirements of the particular circuit design can be used for the IF and Doppler amplifiers. If it seems desirable the IF mixer 50 could be a balanced mixer.

Various conditions of modulation amplitude, modulation frequency, shape and linearity of modulating waveform, and proportion of noise added to a predictable modulating wave have been tried with successful results. The location of the main response peak is virtually independent of modulation parameters, but the width of the main peak as well as the width and amplitude of minor peaks will depend on the amount of carrier frequency deviation caused by the modulating signal. Noise waveforms may be used for modulation in combination with a predictable modulating signal for improved suppression of minor responses.

Using my invention greater non-linearity in the transmitter frequency-voltage characteristic can be tolerated because the reference signal is essentially matched to the target return signal. Therefore, increased transmitter deviation could be used, or transmitter linearity specifications could be relaxed.

Clearly, a jamming signal will have much greater difficulty in passing through the system of my invention in that it will have to withstand comparison both im mixer 47 and mixer 50.

Low frequency noise components will not reach Doppler amplifier 51 because of the second mixing operation at mixer 50, and many will not pass through the pass-band of IF amplifier 48.

While I have described and illustrated a specific embodiment of my invention, it will be clear that many modifications of my invention are possible in view of the teachings herein contained and within the scope of the invention as defined in the appended claims.

I claim:

1. An improved apparatus for receiving and processing the target return signal in an FM-CW distance measuring system, comprising:
   (a) first means receiving said target return signal and comparing said target return signal with a sample of the transmitted signal,
   (b) second means for comparing a sample of the transmitted signal with a delayed sample of said transmitted signal and amplifying the result of said comparison,
   (c) third means connected to the output terminals of said first and said second means for comparing the outputs of said first and said second means,
   (d) fourth means adapted to receive the output of said third means and to select the Doppler frequency component included in said output of said third means,
   (e) utilization means connected to the output of said fourth means and adapted to receive said Doppler frequency.

2. An improved FM-CW distance measuring system that effectively utilizes a delayed reference signal, comprising:
   (a) means for generating and transmitting a frequency modulated continuous wave signal toward potential targets,
   (b) first means for sampling said transmitted signal,
   (c) receiver means connected to said first sampling means for mixing said sampled signal with the transmitted signal returned from a target,
   (d) second means for sampling said transmitted signal,
   (e) an RF delay line connected to receive the signal from said second means,
   (f) first mixing means for producing an IF reference signal by mixing said first sampled signal with said second sampled signal obtained from said delay line and amplifying the mixed signal,
   (g) second mixing means for mixing said IF reference signal and the output from said receiver means,
   (h) means adapted to receive the output of said second mixing means for selecting and amplifying the Doppler output of said second mixing means,
   (i) a detector adapted to receive said amplified Doppler component for producing a signal yielding range information.

3. An improved FM-CW distance measuring system that effectively utilizes a delayed reference signal and materially reduces the possibility of response to a spurious signal, comprising:
   (a) a transmitter that radiates a frequency modulated signal toward potential targets,
   (b) first and second directional couplers the inputs of which are connected to the output of said transmitter,
   (c) first and second mixers,
   (d) means connecting the output of said first directional coupler to the inputs, respectively, of said first and second mixers,
   (e) a delay line connected between the output of said second directional coupler and a second input of said second mixer,
   (f) means connecting the received target return signal to a second input of said first mixer,
   (g) a third mixer,
   (h) a first IF amplifier the input of which is connected to the output of said first mixer and the output of which is connected to a first input terminal of said third mixer, (i) a second IF amplifier the input of which is connected to the output of said second mixer and the output of which is connected to a second input of said third mixer, (1) tuned amplifier connected to the output of said third mixer whereby the Doppler frequency component of said target return signal is selected and amplified, and (2) a detector connected to the output of said tuned amplifier whereby the envelope of the Doppler frequency component is detected to yield range information.

* * * * *